United States Patent [19]

Jolissaint

[11] Patent Number: 5,040,208
[45] Date of Patent: Aug. 13, 1991

[54] COORDINATED VOICE AND DATA DISPLAY HAVING TEMPORARY STORAGE OF TRANSACTION DATA

[75] Inventor: Charles H. Jolissaint, Sunnyvale, Calif.

[73] Assignee: International Business Machines Corporation, Armonk, N.Y.

[21] Appl. No.: 432,144

[22] Filed: Nov. 3, 1989

[51] Int. Cl.$^5$ .............................. H04M 3/58
[52] U.S. Cl. .................... 379/209; 379/201; 379/96; 379/212; 379/67
[58] Field of Search ................... 379/201, 209, 67, 88, 379/89, 210, 211, 212, 213, 265, 266, 96

[56] References Cited

U.S. PATENT DOCUMENTS

| | | | |
|---|---|---|---|
| 3,707,605 | 12/1972 | Lee, Jr. et al. | 379/209 |
| 3,989,899 | 11/1976 | Norwich | 379/134 |
| 4,166,929 | 9/1979 | Sheinbein | 379/209 X |
| 4,436,962 | 3/1984 | Davis et al. | 379/211 |
| 4,599,493 | 7/1986 | Cave | 379/247 |
| 4,656,624 | 4/1987 | Collins et al. | 370/60 |
| 4,763,353 | 8/1988 | Canale et al. | 379/157 |
| 4,788,682 | 11/1988 | Vij et al. | 370/110.1 |
| 4,797,911 | 1/1989 | Szlam et al. | 379/211 |
| 4,805,209 | 2/1989 | Baker, Jr. et al. | 379/212 |

FOREIGN PATENT DOCUMENTS

| | | | |
|---|---|---|---|
| 0177218 | 9/1985 | European Pat. Off. | |
| 0079350 | 4/1986 | Japan | 379/209 |
| 0182357 | 8/1986 | Japan | 379/209 |
| WO8802966 | 4/1988 | PCT Int'l Appl. | |

OTHER PUBLICATIONS

"IDDN-A Basis for Enhanced and New Services for the Next Decades", IEEE Communications Society Internation Symposium 1987, P. Lyhne et al.

"Implementation of Man-Machine Interface in the XE-I SPC International Telephone Switching System", Takeuchi et al.

"ISDN End-User Applications", 8081 Proceedings of the National Communications Forum XXXXI (1987), No. I, Chicago, Ill., B. Newman et al.

"An Advanced Voice/Data Telephone Switching System", 8204 IBM Systems Journal 25 (1986), Nos. 3-4, Part 1, Armonk, NY, J. Kasson.

"Automatic Call Distribution Services in the ROLM CBX", J. Kanow.

Primary Examiner—James L. Dwyer
Attorney, Agent, or Firm—Perman & Green

[57] ABSTRACT

Method and apparatus for processing a telephone call to suspend the call in anticipation of resuming the call at a time in future. A system 10 is disclosed of the type having a plurality of telephones 18 managed by a CBX 14 and a plurality of display terminals 16 managed by a Host processor 12. The CBX 14 is communicatively coupled to the Host processor 12. A caller is prompted to enter information expressive of a time when the caller desires to resume a call and this information is stored. Other information previously obtained from the caller is also stored in anticipation of resuming the call. At the time specified by the caller the call is reestablished and is directed to a telephone 18 associated with an agent. The other information previously stored is recalled and displayed to the agent, thereby providing the agent with a complete record of the information gathered up to the time that the call was suspended.

15 Claims, 2 Drawing Sheets

COORDINATED VOICE AND DATA DISPLAY HAVING TEMPORARY STORAGE OF TRANSACTION DATA

FIELD OF THE INVENTION

This invention relates generally to improvements in data processing applications in a multiplex communication system and, more particularly, to method and apparatus for saving data collected from a caller prior to a suspension of the call such that the data can be restored to an answering agent's terminal when the call is resumed at some time in the future.

BACKGROUND OF THE INVENTION

Information associated with a phone call is often collected by agent's using a computer terminal coupled to a suitable application program. In commonly assigned U.S. Pat. No. 4,805,209, issued on Feb. 14, 1989, William T. Baker, Jr. et al. teach a host computer for providing real time coordination of caller data with caller phone connections managed by a digital switch, or Computerized Branch Exchange (CBX). An agent transferring a caller to another agent has the caller information terminal screen transferred along with the caller.

However, some call processing situations controlled by a CBX result in a temporary suspension of a phone call. Examples include CBX capabilities such as a Camp-on Callback or a Callback Request that is communicated to the associated host processor, for example a message to be called back at some future, mutually agreed upon time.

Such capabilities, where a phone conversation is suspended and subsequently continued at possibly some indeterminate time in the future, present a more complex phone processing situation than that of a normal call that continues substantially uninterrupted to completion. One problem is created in that only a portion of the information required of the caller may have been gathered before the suspension in the phone call. For example, a caller may have provided certain account related information in preparation to being connected to a call processing resource such as an agent. If, however, all agents are busy the caller may elect not to remain on hold but may elect instead to be called back to complete the transaction.

For obvious reasons an unsatisfactory solution to this problem is to require the caller to provide for a second time the already provided information.

It is thus an object of the invention to provide method and apparatus to manage and save information collected from a caller prior to a suspension of a telephone call for a later association of the saved information with a subsequent continuation of the call.

It is another object of the invention to provide, for use in a Call Management Control System (CMCS) including a CBX for managing a plurality of phones and a Host processor for managing a plurality of display terminals, method and apparatus to manage and save information collected from a caller prior to a suspension of a telephone call for a later association of the saved information with a subsequent continuation of the call.

SUMMARY OF THE INVENTION

The above mentioned and other problems are solved and the objects of the invention are realized by method and apparatus for processing a telephone call to suspend the call in anticipation of resuming the call at a time in future. A system is disclosed of the type having a plurality of telephones managed by a digital switch or CBX and a plurality of display terminals managed by a Host processor. The CBX is communicatively coupled to the Host processor. The invention provides for prompting a caller to enter information expressive of a time when the caller desires to resume a call and storing the information entered by the caller. Other information previously obtained from the caller is also stored at this time in anticipation of resuming the call. This other information may be information that is displayed on a display screen associated with an agent, for example, order entry information or airline reservation information. At the time specified by the caller the call is reestablished and is directed to a telephone associated with an agent. The other information previously stored is recalled and displayed to the agent, thereby providing the agent with a complete record of the information gathered up to the time that the call was suspended.

The call may be restored in response to a Callback or a Camp-on request made by the caller in which case the CBX reactivates the call by dialing the caller back. The CBX also sends an event to the Host processor notifying the Host processor that the call has been reactivated. The call may instead be reestablished by the CBX in response to a command sent from the Host processor.

BRIEF DESCRIPTION OF THE DRAWING

The above set forth and other features of the invention will be made more apparent in the ensuing Detailed Description of the Invention when read in conjunction with the attached Drawing, wherein.

DETAILED DESCRIPTION OF A PREFERRED EMBODIMENT OF THE INVENTION

Figure 1:
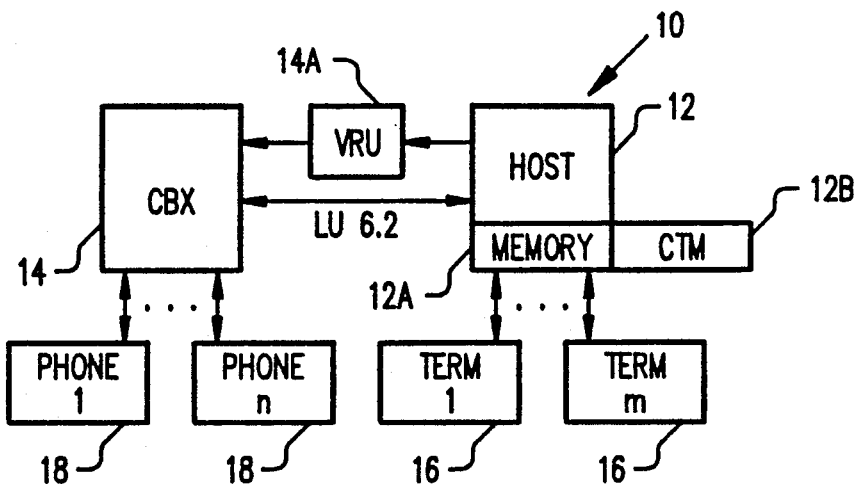
FIG. 1 is a block diagram illustrating major functional blocks of a telephone system embodying the invention.

FIG. 1 illustrates in block diagram form a telephony system, in particular a Call Management Control System (CMCS) 10 that embodies the teachings of the invention. System 10 in a presently preferred embodiment of the invention includes a host processor (Host) 12 coupled via a Logical Unit (LU) 6.2 interface to a digital switch, such as a Computerized Branch Exchange (CBX) 14. The Host 12 includes a MEMORY 12A that is comprised of both temporary RAM and a mass storage device such as a magnetic disk or magnetic tape unit. Particularly suitable apparatus that embodies these functional blocks is described in detail in the above mentioned commonly assigned U.S. Pat. No. 4,805,209, issued Feb. 14, 1989. The disclosure of U.S. Pat. No. 4,805,209 is incorporated by reference herein in its entirety. Although the ensuing description is made in reference to a hardware and software system as described in U.S. Pat. No. 4,805,209 it should be realized that the teaching of the invention is not limited for use with only such a system and that, instead, the teaching of the invention is applicable to a large number of possible hardware and/or software embodiments.

The Host 12 may be a type of IBM System/370 processor, a description of which is found in a document entitled "S/370 Reference Summary, GX20-1850", published by the International Business Machines Corporation. While the Host 12 in a presently preferred embodiment of the invention is embodied in a S/370 processor it should be realized that the invention can be practiced with other mainframes, minicomputers or microprocessors.

The CBX 14 may be a CBX known in the art as a ROLM CBX II 9000, a description of which is found in a document entitled "ROLM CBX II 9000 Business Communications System", published by the ROLM Corporation (1986). It should be realized however that the invention can be practiced with other varieties of CBX equipment.

The LU 6.2 communication link between the Host 12 and the CBX 14 is a standard System Data Link Control (SDLC) communication link that corresponds to the LU 6.2 standard. A detailed description of a LU 6.2 communication link and a description of how to implement a program interface to conform with this standard is provided in the following documents published by the International Business Machines Corporation: "Systems Network Architecture: Sessions Between Logical Units, GC20-1868" and "SNA Transaction Programmer's Reference Manual For LU 6.2, GC30-3084". In other embodiments of the invention the link between the Host 12 and the CBX 14 may be other than a communication link that conforms to the LU 6.2 standard.

As described in U.S. Pat. No. 4,805,209 there are coupled to Host 12 a plurality of user interface terminals, shown herein as terminals 16 (TERM 1 through TERM m). Coupled to CBX 14 are a plurality of phones, shown herein as phones 18 (PHONE 1 through PHONE n). Also coupled to CBX 14 is a phone trunk (not shown) containing voice-carrying signal lines.

A caller into the CMCS 10 may encounter situations in which a call processing resource, for example an agent or specialist provided to answer the caller's information request, is congested beyond a time considered reasonable for the caller to wait in a queue on the CBX 14. If this situation arises the caller may invoke an existing CBX 14 Callback or Camp-on feature that provides for the caller to be called back when the CBX 14 detects the resource is no longer busy.

Figure 2:
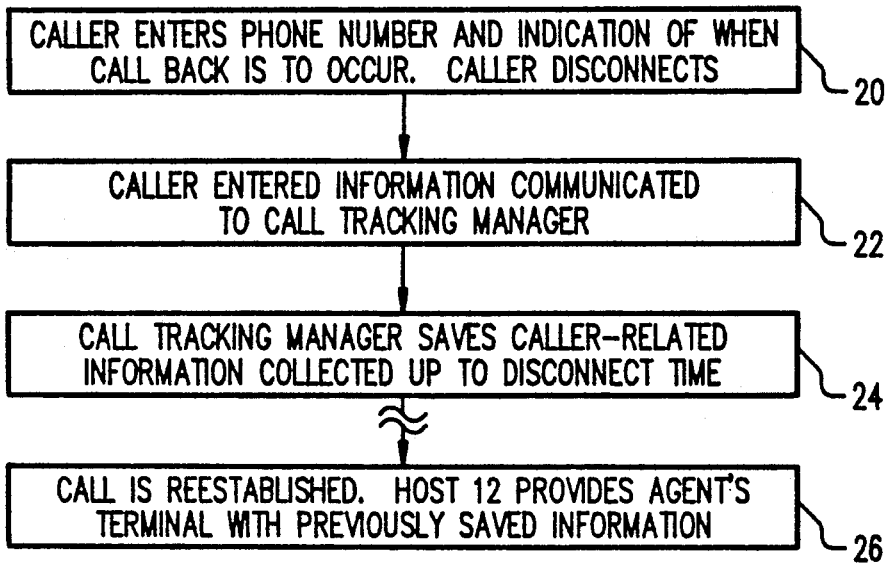
FIG. 2 is a flow chart illustrating a method of the invention.

Alternatively, and in accordance with an aspect of the invention, the CBX 14 initially detects such congestion and routes the caller to a messaging and/or voice response unit (VRU) 14A that informs the caller of the congestion and offers the caller an option to leave a message to be called back. If Callback is indicated by the caller the VRU 14A requests the caller to enter his phone number, if not already known through, for example, ANI, and an indication of a time when the caller should be called back (FIG. 2, block 20). That is, should the caller be called back immediately upon agent availability; within some predetermined interval of time, such as within a half-hour or during the evening; or at any time (don't care). The callback information may be entered by the caller with well-known DTMF tones or by speaking the information to a voice recognition unit (not shown) associated with the CBX 14. In any event, the CBX 14 includes apparatus for receiving information from the caller and for providing the information in suitable form to other portions of the CMCS 10, such as a Call Tracking Manager executed by the Host 12. The operation of the Call Tracking Manager is set forth in U.S. Pat. No. 4,805,209 where the Call Tracking Manager is numbered 2032 and is shown in FIG. 24.

The caller entered callback information is communicated via the LU 6.2 link to the Call Tracking Manager (FIG. 2, block 22), designated CTM 12B in FIG. 1. CTM 12B keeps track of the current time of day and also the caller's callback request. The CTM 12B also saves in Memory 12A the caller information collected to the point in time when the call is suspended for future retrieval when the call is restored (FIG. 2, block 24).

This latter aspect of the invention in an improvement in the operation of the Call Tracking Application 2032 of U.S. Pat. No. 4,805,209 which has a limited ability to save caller information for a call that does not continue to a normal completion. For example, in FIG. 9, block 720 the host stores caller data by updating a Call Management Control Table (shown in FIG. 18) in response to a queued caller who hangs up.

If the call is restored in response to a Callback or a Camp-on request the CBX 14 reactivates the call by dialing the caller back. The CBX 14 sends an event to the Host 12 notifying the Host 12 that the call has been reactivated. The Host 12 upon receiving the call connection information from the CBX 14 retrieves the stored caller information from MEMORY 12A. The Host 12 then restores the caller information screen on the appropriate agent's TERM 16 (FIG. 2, block 26), and directs the call to the corresponding agent's PHONE 18 in a manner described in U.S. Pat. No. 4,805,209. In accordance with an aspect of the invention the caller information restored includes the information collected prior to the previous suspension of the call.

If the call is instead reinitialized in the CBX 14 by a command from the Host 12 the Host 12 may employ a number of known methods to instruct the CBX 14 to reestablish the call. If a message had been left on a messaging device, the Host 12 instructs the messaging device to call an appropriate one of the agents and play the message. The Host 12 also provides the messaging device the caller's phone number such that the agent can return the call after listening to the message. Alternatively, call events received from the CBX 14 cause Host 12 to display the caller's information screen on an agent's TERM 16 in concert with delivery of the caller's message by the messaging device. The agent may then indicate to the messaging device to place the call to the original caller. At this time call processing reverts back to that described in U.S. Pat. No. 4,805,209.

If instead the callback request was made via the VRU 14A to directly access the Host 12 the Host 12 may command the CBX 14 to reestablish the call between a particular agent and the original caller. The Host 12 transmits a message to the agent's TERM 16 notifying the agent of the action being performed and thereafter restores to the TERM 16 a display of the caller's original information screen, the original information having been stored in MEMORY 12A at the time the original call was suspended. At this point the call processing reverts to that disclosed in U.S. Pat. No. 4,805,209.

Considering the method of the invention in greater detail for VRU 14A callback, the caller enters by DTMF a phone number and a time to be called back in minutes. This information is transmitted to Host 12 through an Application Program Interface. Typically the caller times out while waiting in queue for an available agent. The caller is routed to a message device or to the VRU 14A to ask if the caller wants to be called back. If the caller indicates that callback is desired the callback information is transmitted to Host 12 which saves the present caller environment. Host 12 then monitors agent activity and controls agent availability to receive new calls from the CBX 14 queue. Either upon a condition of no further calls in the CBX 14 queue or the caller callback time period about to expire, the Host 12 signals the VRU 14A to recall the caller and transfer the call to a specified idle agent. If the messaging device is employed the Host 12 signals the messaging device (e.g. phonemail system) to call the agent, play the recorded message and upon agent request call the original caller back connecting the agent and caller.

Figure 3:
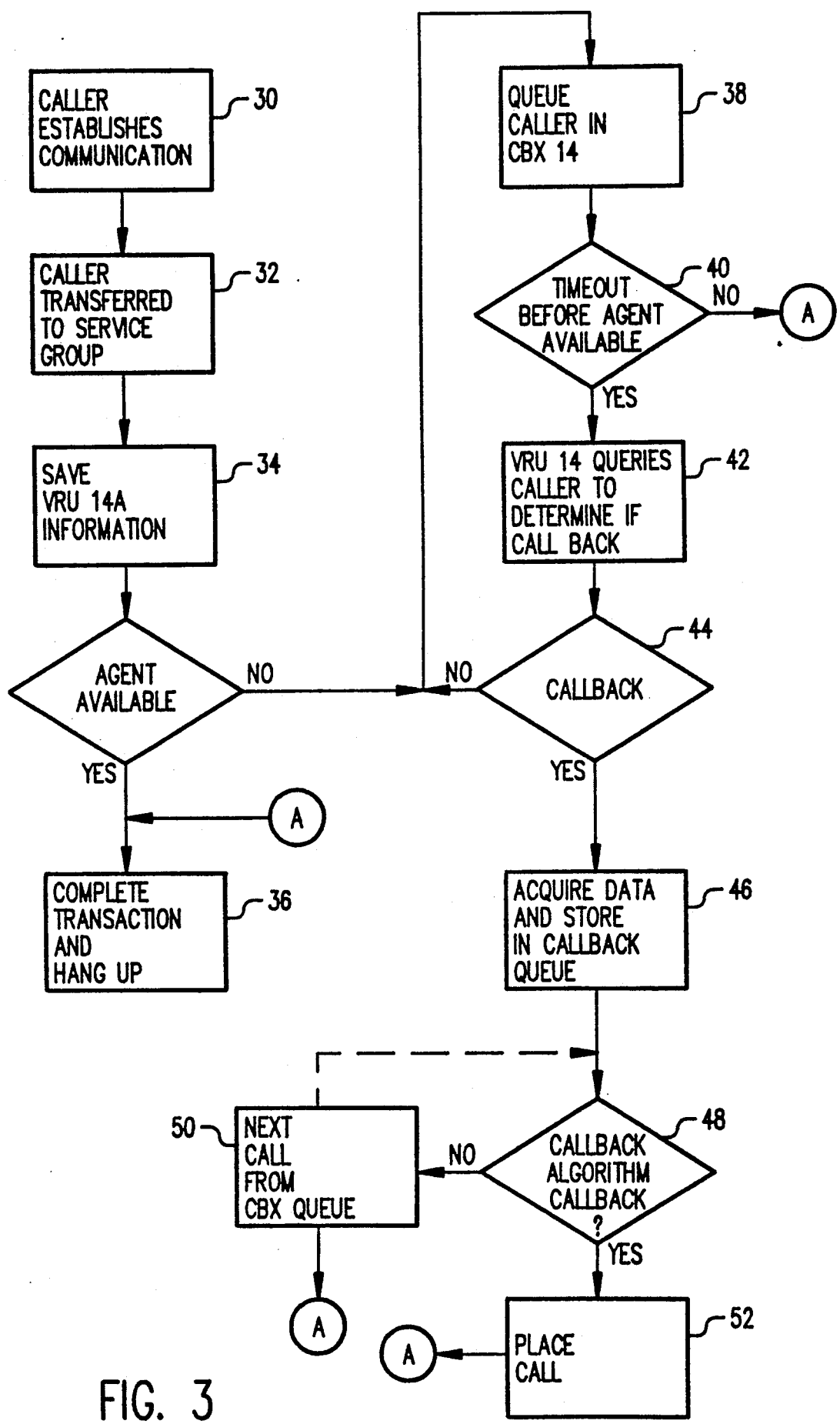
FIG. 3 is another flow chart showing in greater detail the steps of the method of the invention.

Referring to FIG. 3 exemplary caller interactions are described. At block 30 a caller initially is connected to the VRU 14A and enters account information using TOUCHTONE(tm) features to enable access to account information.

If the caller indicates that he requires personal attention the VRU 14A transfers the caller to an ACD service group using CBX 14 transfer features (block 32).

In accordance with U.S. Pat. No. 4,805,209 caller account information and specific activity information is saved for later display on an agent terminal (block 34).

If an agent is available the caller is connected and caller-related information is displayed on the agent's terminal. After completing the transaction the caller hangs up (block 36).

If an agent is not available the caller queues in CBX 14 on an ACD service group for connection to the first available agent (block 38).

If an agent becomes available before overflow time out the agent is connected to the caller and the caller's information is displayed on the agent's screen. After completing the transaction the caller hangs up (block 40).

If an agent does not become available and after waiting a configurable amount of time in the CBX 14 queue, the CBX 14 sends the caller to the VRU 14A. The VRU 14A asks the caller if the caller wants to be called back (block 42).

If the caller responds that callback is not desired the VRU 14A returns the caller to the CBX 14 queue to wait for the first available agent (block 44).

IF the caller instead responds that callback is desired the VRU 14A requests that the caller enter a phone number and how long the caller will be available at that number. The VRU 14A communicates this information to Host 12 software that stores the caller information. The caller hangs up but the call has been transferred to a controlled callback queue maintained in MEMORY 12A by the Host 12. The Host 12 monitors system activity for either the CBX 14 queue becoming idle with available agents or that the length of time the caller is to be at the number is about to be exceeded (block 46).

Each time an agent becomes available the agent requests the Host 12 to make him available to process another call. The Host 12 determines if the agent should receive either the next call from the CBX 14 queue or a callback call from the callback queue. The Host 12 makes this determination using a "callback algorithm" as described below (block 48).

If the next agent call is determined to be from the CBX 14 queue the Host 12 signals the CBX 14 to make the agent available and the agent receives the next call queued. After completing the transaction the caller hangs up (block 50).

If the next call is determined to be from the Host 12 callback queue the Host 12 instructs the CBX 14 to make the outbound call to the original caller and connect to the identified agent's phone. In accordance with the invention the previously saved caller information is retrieved from memory and displayed on the associated agent's terminal. After completing the transaction the caller hangs up (block 52).

Figure 4:
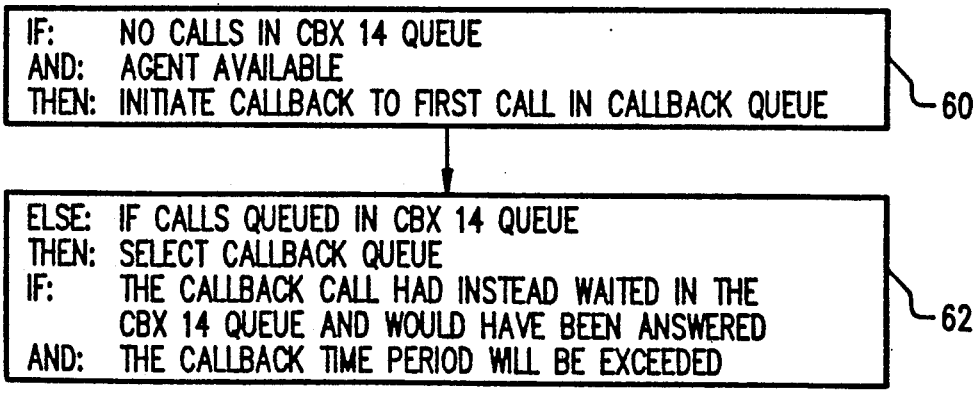
FIG. 4 is a flow chart that depicts the steps of a callback algorithm that is one aspect of the invention.

The aforementioned callback algorithm is illustrated in FIG. 4. Calls from the callback queue maintained in MEMORY 12A by Host 12 are activated as follows.

If no calls are queued in the CBX 14 and an agent becomes available, the Host 12 initiates callback to the first call in the callback queue (block 60).

If calls are queued in the CBX 14, then the callback queue call is selected as the next call only if (a) had the callback call instead waited in the CBX queue instead of indicating callback and the callback call would have been answered and (b) the callback time period is about to be exceeded (e.g. callback period minus some time threshold) (block 62). By example, a caller indicates immediate callback and hangs up. If during the time elapsed since the caller has hungup the caller would have been serviced from the CBX 14 queue the caller is then selected from the callback queue. Preferably, by indicating callback a caller should not be serviced before a time the caller would have been serviced had the caller instead entered the CBX 14 queue.

Ordering of calls in the callback queue is by priority order established by an application programmer (e.g. caller incoming trunk group, caller dialed number, or caller id, ANI), with second ordering by time to be called back.

A further aspect of the invention relates to the Host 12 selecting phone numbers for calling and placing these selected numbers within the callback queue. By example, a system may be configured wherein agents generally process incoming calls, such as orders, but make outgoing calls, such as requests for warranty sales, only when idle. Host 12 may select from a stored data base customer phone numbers for warranty calls and place these numbers and other information in the callback queue for connection to agents as the agents become available. When the call is made the agent's terminal shows the required customer information and indicates if the call was placed as a result of a previous customer callback request or at the initiative of the Host 12.

Thus, while the invention has been particularly shown and described with respect to a preferred embodiment thereof, it will be understood by those skilled in the art that changes in form and details may be made therein without departing from the scope and spirit of the invention.

Having thus described my invention, what I claim as new, and desire to secure by Letters Patent is:

1. A method of processing a telephone call to suspend the call in anticipation of resuming the call at a time in the future, the method comprising the steps of:

in response to a telephone call placed by a caller to a destination having a call processing system, the call being placed at a time when there is no call processing resource that is currently available to communicate with the caller, interrogating the caller with the call processing system to determine if (a) the caller desires to maintain the call connection until such time as a call processing resource is available, or if (b) the caller desires to terminate the call connection and to be called back at some future time when a call processing resource is available;

in response to the caller indicating that the call connection is to be maintained, placing the caller in a call hold queue means pending availability of a call processing resource; or in response to the caller indicating that the call connection is to be terminated, prompting the caller to enter information that is expressive at least of a time when the caller desires to resume the call;

storing the information entered by the caller;

storing other information received from the caller, if any, prior to a suspension of the call;

reestablishing the telephone call at a time indicated by the information entered by the caller, the reestablished telephone call being directed to a telephone associated with a call processing resource;

recalling the other information previously stored; and providing the other information to the call processing resource.

2. A method as set forth in claim 1 wherein the step of reestablishing the telephone call is initiated by a digital switch means and includes a step of sending a message indicating that the call has been reestablished, the message being sent from the digital switch means to a processing means.

3. A method as set forth in claim 2 wherein the step of reestablishing the telephone call is initiated by the digital switch means in response to the caller having previously invoked a Callback or a Camp-on request.

4. A method as set forth in claim 1 wherein the step of reestablishing the telephone call is initiated by a processing means and includes a step of sending a message to reestablish the call from the processing means to a digital switch means.

5. A method as set forth in claim 1 wherein the step of sending a message includes a further step of displaying information on a display screen associated with an agent, the displayed information notifying the agent that the telephone call is being reestablished.

6. A method as set forth in claim 1 wherein the step of reestablishing the telephone call is initiated by a processing means and includes a step of sending a message to an agent instructing the agent to reestablish the call.

7. A method as set forth in claim 1 wherein the step of prompting includes a step of transmitting the information from a digital switch means to a processing means.

8. Apparatus for processing a telephone call to suspend the call in anticipation of resuming the call at a time in future, the apparatus comprising:

means, responsive to a telephone call placed by a caller at a time when there is no call processing resource that is currently available to communicate with the caller, for interrogating the caller to determine if (a) the caller desires to maintain the call connection until such time as a call processing resource is available, or if (b) the caller desires to terminate the call connection and to be called back at some future time when a call processing resource is available;

means, responsive to the caller indicating that the call connection is to be terminated, for prompting the caller to enter information expressive of a time when the caller desires to resume the call;

means for storing the information entered by the caller;

means for storing other information received from the caller, if any, prior to a suspension of the call;

means for reestablishing the telephone call at a time indicated by the information entered by the caller, the reestablished telephone call being directed to an available call processing resource;

means for recalling the other information previously stored; and means for providing the other information to the available call processing resource to which the caller has been directed.

9. Apparatus as set forth in claim 8 wherein said prompting means includes means for transmitting the information entered by the caller to a processing means over a communication link.

10. Apparatus as set forth in claim 9 wherein said communication link conforms to a LU 6.2 standard.

11. Apparatus as set forth in claim 8 wherein the apparatus is associated with a system of the type having a plurality of telephones managed by a digital switch means and a plurality of display terminals managed by a processing means, the digital switch means being communicatively coupled to the processor means, and wherein said digital switch means includes a CBX coupled to a voice trunk.

12. Apparatus as set forth in claim 8 wherein said prompting means includes a Voice Response Unit.

13. A method of processing a telephone call with a call processing system, the method comprising the steps of:

in response to an incoming telephone call wherein no resource is available to process the call, interrogating the caller to determine if the caller desires to (a) wait for a call processing resource to become available or desires (b) to be called back at some time in the future;

if the caller indicates a desire to wait for a call processing resource to become available, the method includes the further step of placing the call in a first queue means associated with a digital switch means; or if the caller indicates a desire to be called back, the method includes a step of placing the call within a second queue means associated with a call processing system controller; and monitoring a state of the first queue means and a state of the second queue means to process queued calls, the step of monitoring including the steps of, if no calls are queued in the first queue means and a call processing resource becomes available, initiating a call to the first call in the second queue means; or if at least one call is queued in the first queue means, selecting a call from the second queue means only if (a) the call would have been answered had the call been placed instead in the first queue means and (b) a required time to make the call is soon to expire.

14. A method as set forth in claim 13 wherein the step of placing the call within the second queue means includes the steps of:

prompting the caller to enter information at least expressive of a time when the caller is to called back and a telephone number to be called;

storing the information entered by the caller;

storing other information, if any, associated with the caller;

reestablishing the telephone call in accordance with the information entered by the caller;

recalling the other information, if any, previously stored; and processing the call to completion.

15. A method as set forth in claim 13 and including the steps of:

accessing a data storage means to obtain a telephone number to call and information relating to the telephone number;

placing the telephone number to be called within the second queue means; and in response to a call processing resource being available, initiating a telephone call to the telephone number while providing the associated information to the call processing resource.

* * * * *

UNITED STATES PATENT AND TRADEMARK OFFICE
CERTIFICATE OF CORRECTION

PATENT NO. : 5,040,208
DATED : August 13, 1991
INVENTOR(S) : Charles H. Jolissaint It is certified that error appears in the above-identified patent and that said Letters Patent is hereby corrected as shown below:

In Claim 11, Col. 8, line 22 change "processing" to --processor--.

Signed and Sealed this

Twenty-second Day of December, 1992

Attest:

DOUGLAS B. COMER

*Attesting Officer*  *Acting Commissioner of Patents and Trademarks*